(12) United States Patent
Hebrink et al.

(10) Patent No.: US 11,111,395 B2
(45) Date of Patent: Sep. 7, 2021

(54) SURFACE STRUCTURED ARTICLES AND METHODS OF MAKING THE SAME

(71) Applicant: 3M INNOVATIVE PROPERTIES COMPANY, St. Paul, MN (US)

(72) Inventors: Timothy J. Hebrink, Scandia, MN (US); Rachael A. T. Gould, Forest Lake, MN (US); Moses M. David, Woodbury, MN (US); Rebecca L. A. Everman, St. Paul, MN (US); Simon K. Shannon, Woodbury, MN (US); Ta-Hua Yu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 16/471,873

(22) PCT Filed: Dec. 19, 2017

(86) PCT No.: PCT/US2017/067311
§ 371 (c)(1),
(2) Date: Jun. 20, 2019

(87) PCT Pub. No.: WO2018/118916
PCT Pub. Date: Jun. 28, 2018

(65) Prior Publication Data
US 2020/0087520 A1    Mar. 19, 2020

Related U.S. Application Data

(60) Provisional application No. 62/437,926, filed on Dec. 22, 2016.

(51) Int. Cl.
*C09D 5/16* (2006.01)
*A01N 59/20* (2006.01)

(52) U.S. Cl.
CPC ........... *C09D 5/1681* (2013.01); *A01N 59/20* (2013.01); *C09D 5/1693* (2013.01); *Y10T 428/24479* (2015.01)

(58) Field of Classification Search
CPC .... C09D 5/1681; C09D 5/1693; A01N 59/20; Y10T 428/24479
(Continued)

(56) References Cited

U.S. PATENT DOCUMENTS 5,069,403 A    12/1991    Marentic
5,133,516 A    7/1992    Marentic
(Continued)

FOREIGN PATENT DOCUMENTS

EP    1475414    11/2004
TW    201418376    5/2014
(Continued)

OTHER PUBLICATIONS

Casse, "Combinatorial Materials Research Applied to the Development of New Surface Coatings V: Application of a Spinning Water-Jet for the Semi-High Throughput Assessment of the Attachment Strength of Marine Fouling Algae," Biofouling, 2007, vol. 23, No. 2, pp. 121-130.
(Continued)

*Primary Examiner* — Catherine A. Simone
(74) *Attorney, Agent, or Firm* — Bradford B. Wright

(57) ABSTRACT

Surface structured articles comprising a polymer matrix and a dispersed phase, the article having first and second opposed major surfaces, at least a portion of the first major surface is a microstructured, anisotropic surface comprises features having at least one dimension in a range from 1 micrometer to 500 micrometers, wherein the dispersed phase comprises an antimicrobial material, and wherein at least a portion of the dispersed phase is present on the
(Continued)

microstructured, anisotropic surface. Surface structured articles are useful, for example, for marine applications (e.g., surfaces in contact with water (e.g., fresh water, ocean water)) such as boats, ships, piers, oil rigs, decks, and roofing materials.

14 Claims, 2 Drawing Sheets

(58) Field of Classification Search
USPC .......................................... 428/141, 156, 167
See application file for complete search history.

(56) References Cited

U.S. PATENT DOCUMENTS

| | | | |
|---|---|---|---|
| 5,221,497 A | | 6/1993 | Watanabe |
| 6,146,688 A | * | 11/2000 | Morgan ................ A61L 29/085 427/2.28 |
| 6,313,335 B1 | | 11/2001 | Roberts |
| 6,475,616 B1 | | 11/2002 | Dietz |
| 7,070,850 B2 | | 7/2006 | Dietz |
| 8,142,531 B2 | | 3/2012 | Adefris |
| 2010/0165276 A1 | | 7/2010 | David |
| 2011/0281068 A1 | * | 11/2011 | David .................... G02B 1/118 428/141 |
| 2012/0309625 A1 | | 12/2012 | Merlet |
| 2013/0040126 A1 | | 2/2013 | Pett |
| 2013/0182331 A1 | | 7/2013 | Hebrink |
| 2013/0211310 A1 | * | 8/2013 | Bommarito ........... B08B 17/065 602/48 |
| 2014/0008324 A1 | | 1/2014 | Appeaning |

FOREIGN PATENT DOCUMENTS

| | | |
|---|---|---|
| WO | WO 1995-016754 | 6/1995 |
| WO | WO 2010-042935 | 4/2010 |
| WO | WO 2010-078071 | 7/2010 |
| WO | WO 2011-034931 | 3/2011 |
| WO | WO 2013-172794 | 11/2013 |
| WO | WO 2015-200669 | 12/2015 |

OTHER PUBLICATIONS

Majumdar, "Combinatorial Materials Research Applied to the Development of New Surface Coatings XIII: An Investigation of Polysiloxane Anti-Microbial Coatings Containing Tethered Quaternary Ammonium Salt Groups," Journal of Combinatorial Chemistry, Oct. 2009, vol. 11, No. 6, pp. 1115-1127.

International Search Report for PCT International Application No. PCT/US2017/067311, dated Mar. 12, 2018, 5 pages.

* cited by examiner

SURFACE STRUCTURED ARTICLES AND METHODS OF MAKING THE SAME

CROSS REFERENCE TO RELATED APPLICATION

This application claims the benefit of U.S. Provisional Patent Application No. 62/437,926, filed Dec. 22, 2016, the disclosure of which is incorporated by reference herein in its entirety.

BACKGROUND

Marine biofouling is a significant problem for a wide variety of industries and markets including shipping, offshore oil drilling, recreational boating, and marinas. Algae and other aquatic organisms attached to ships will increase their drag when moving through water and thus increases their fuel consumption. Removal of algae and barnacles from boat and ship hulls is very costly and typically the vessels are taken out of service to grind their hulls clean with abrasives and be repainted. Roofing and decking materials are also prone to biofouling which requires costly maintenance or reduces the useful life of the roof or deck material.

Additional solutions for removing algae and other aquatic organisms attached to ships, roofing materials and/or deck materials and/or reducing or prevent algae and other aquatic organisms from attaching to such surfaces is desired.

SUMMARY

In one aspect, the present disclosure provides a surface structured article comprising a polymer matrix and a dispersed phase, the article having first and second opposed major surfaces, at least a portion of the first major surface is a microstructured, anisotropic surface comprises features having at least one dimension in a range from 1 micrometer to 500 micrometers (in some embodiments, in a range from 10 micrometers to 500 micrometers, or even 25 micrometers to 500 micrometers), wherein the dispersed phase comprises an antimicrobial material, and wherein at least a portion of the dispersed phase is present on the microstructured, anisotropic surface.

In another aspect, the present disclosure provides a method of making surface structured articles described herein, the method comprising:

providing a polymer matrix comprising a dispersed phase; and anisotropically etching the polymer matrix using plasma to form the anisotropic surface.

In another aspect, the present disclosure provides a method of making surface structured articles described herein, the method comprising:

providing a polymer matrix comprising a dispersed phase; and etching at least a portion of the polymer matrix to expose at least a portion of the dispersed phase using plasma to form a random structured surface.

Embodiments of articles described herein can be applied to surfaces to reduce the drag caused by fluids (e.g., air, gas, water, etc.) flowing across such surfaces. For example, in some embodiments, an article that reduces drag comprises an outer layer having an exposed, patterned surface that reduces the drag caused by a fluid flowing over the surface; an adhesive bonding layer for attachment of the article to such surfaces; and in some embodiments, additional intermediate layers between the outer layer and the adhesive bonding layer.

Embodiments of surface structured articles described herein are useful, for example, for marine applications (e.g., surfaces in contact with water (e.g., ocean water, fresh water)) such as boats, ships, piers, oil rigs, docks, decks, roofing materials, and the inside of pipes and tubing.

DETAILED DESCRIPTION

Figure 1:
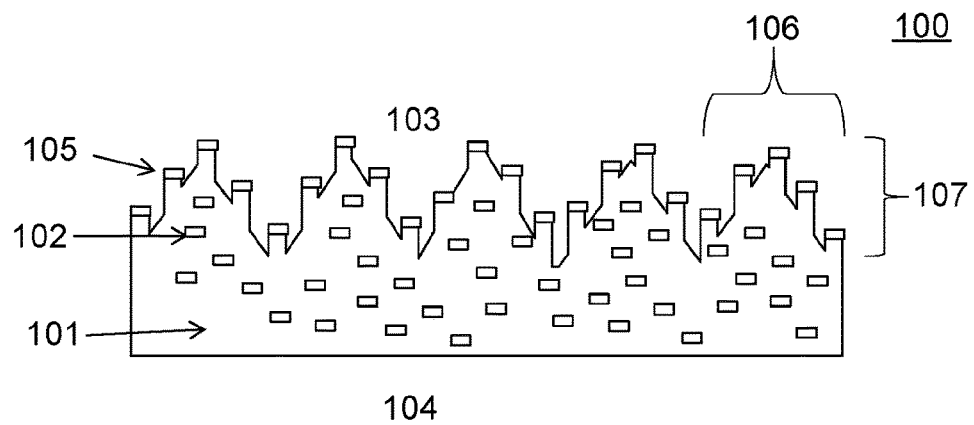
FIG. 1 is a cross-section of an exemplary surface structured article described herein.

Referring to FIG. 1, exemplary surface structured article 100 has polymer matrix 101 and dispersed phase 102. Article 100 has first and second opposed major surfaces 103, 104, at least a portion of first major surface 103 is a microstructured, anisotropic surface 105. Microstructured, anisotropic surface 105 has features 106 having at least one dimension 107 in a range from 1 micrometer to 500 micrometers. Dispersed phase 102 comprises an antimicrobial material. At least a portion of dispersed phase 102 is present on microstructured, anisotropic surface 105.

In some embodiments, the antimicrobial material comprises metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride) (e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate) (e.g., at least one of copper salt, cobalt salt, nickel salt, silver salt, gold salt, platinum salt, tin salt, zinc salt, tantalum salt, zirconium salt, or titanium salt) (including mixtures and/or alloys thereof).

In some embodiments, the antimicrobial comprises polyatomic ionic materials (e.g., quaternary salt) and polymeric materials (e.g., at least one of fluoropolymer, polyurethane, or siloxane). Antimicrobial dispersed phase may aid in reducing or preventing the growth of algae, mollusks, barnacles, and other marine organisms.

In some embodiments, the features comprise linear prisms, and the at least one dimension is a peak to valley height of the feature, wherein the peak to valley height is in a range from 1 micrometer to 500 micrometers (in some embodiments, in a range from 10 micrometers to 500 micrometers, 25 micrometers to 500 micrometers, 25 micrometers to 250 micrometers, 25 micrometers to 100 micrometers, or even 25 micrometers to 75 micrometers). Peak to valley height in this range tend to have more desirable reduction in a fluid such as water. Peak to valley height in the narrowing ranges tend to have more desirable reduction in a fluid such as air.

In some embodiments, the microstructured, anisotropic surface comprises linear grooves with a peak to valley height in a range from 1 micrometers to 500 micrometers (in some embodiments, in a range from 1 micrometer to 250 micrometers, 1 micrometer to 100 micrometers, 1 micrometer to 50 micrometers, 1 micrometer to 25 micrometers, 1 micrometer to 10 micrometers, 1 micrometer to 5 micrometers, or even 100 micrometers to 500 micrometers).

Figure 2:
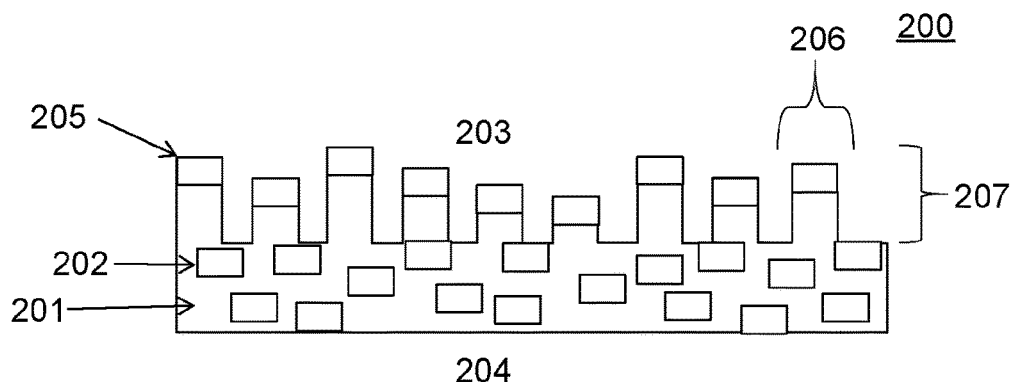
FIG. 2 is a cross-section of an exemplary surface structured article described herein

Referring to FIG. 2, exemplary surface structured article 100 has polymer matrix 201 and dispersed phase 202. Article 200 has first and second opposed major surfaces 203, 204, at least a portion of first major surface 203 is a microstructured, anisotropic surface 205. Microstructured, anisotropic surface 205 has features 206 having at least one dimension 207 in a range from 1 micrometer to 500 micrometers. Dispersed phase 202 comprises an antimicrobial material. At least a portion of dispersed phase 202 is present on microstructured, anisotropic surface 205.

In some embodiments, the features have a major dimension substantially collinear with a first axis and a minimum dimension substantially collinear with a second axis. In some embodiments, the features comprise ovoid (e.g., ellipsoids, spheroids, or egg-shaped) shaped features.

Figure 3:
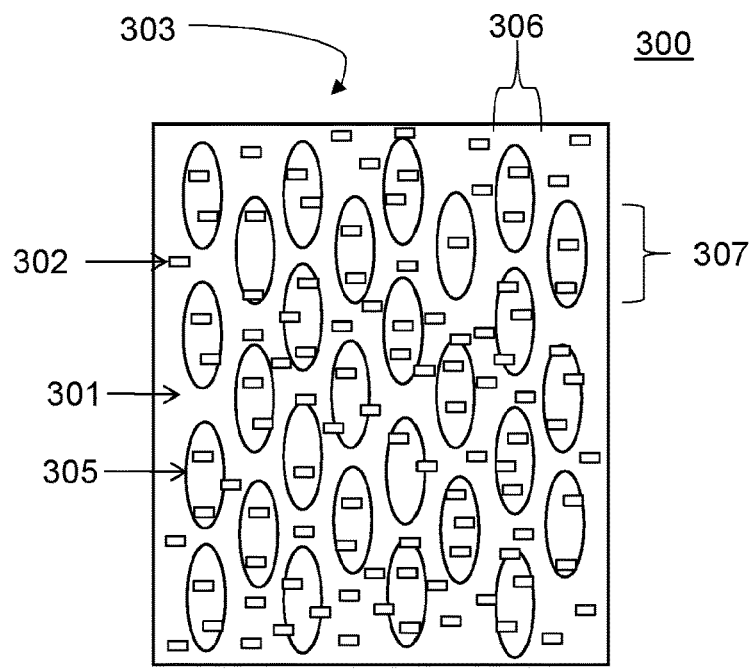
FIG. 3 is a top view of an exemplary surface structured article described herein.

Referring to FIG. 3, top surface 303 of exemplary surface structured article 300 has polymer matrix 301 and dispersed phase 302. At least a portion of first major surface 303 is a microstructured, anisotropic surface 305. Microstructured, anisotropic surface 305 has features 306 having at least one dimension 307 in a range from 1 micrometer to 500 micrometers. Dispersed phase 302 comprises an antimicrobial material. At least a portion of dispersed phase 302 is present on microstructured, anisotropic surface 305.

In some embodiments, there is a microstructured pattern having spaced-apart peaks, wherein peak-to-peak spacing is greater than the base width of the peak (e.g., having 80-micrometer tall linear prism features, an 80-micrometer base, and 160 micrometers between peaks).

In some embodiments, articles described herein can be applied to surfaces to reduce the drag caused by fluids (e.g., salt water, fresh water, beverages, etc.) flowing across such surfaces. In some embodiments, article described herein having such drag reduction comprises an outer layer having an exposed, patterned surface that reduces the drag caused by a fluid flowing over the surface; an adhesive bonding layer for attachment of the article to such surfaces; and optionally intermediate layers between the outer layer and the adhesive bonding layer. The exposed, patterned surface in the outer layer generally comprises a series of generally parallel peaks separated by a series of generally parallel valleys, although a variety of wave forms (e.g., rows of linear peaks and valleys in parallel with linear rows of peaks and valleys) are possible so long as they reduce the drag caused by a fluid flowing over the surface to which the drag reduction article has been attached. Further, the wave forms such as peaks and valleys can be continuous or discontinuous pattern. Also, the wave form can be on only a portion of a surface of the article. The wave form such as valleys may either narrow or widen as the peak or valley progresses from one end of the article to the other. Also, the height and/or width of a given peak or valley may change as the peak or valley progresses from one end of the peak to the next valley or from one end of the valley to the next peak to another.

The particular dimensions of the wave form peaks and valleys may vary and be adjusted to provide a desired reduction in drag achievable for selected wave form.

In some embodiments, surface structured article described herein further comprising a nanostructured surface on the microstructured, anisotropic surface. In some embodiments, surface structured article described herein, the nanostructured surface comprises nanoscale features having a height to width ratio in a range from 0.1:1 to 5:1 (in some embodiments, in a range from 0.1:1 to 3:1, or even 0.25:1 to 2:1). In some embodiments, the nanoscale features comprise nano-pillars.

In some embodiments, the microstructured, anisotropic surface comprises inorganic material (e.g., at least one of metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride) (e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate) (e.g., at least one of copper salt, cobalt salt, nickel salt, silver salt, gold salt, platinum salt, tin salt, zinc salt, tantalum salt, zirconium salt, or titanium salt) (including mixtures and/or alloys thereof). Metal oxides such as cuprous oxide, zinc oxide, and silver oxide may aid in reducing or preventing the growth of algae, mollusks, barnacles, and other marine organisms.

In some embodiments, the antimicrobial comprises polyatomic ionic materials (e.g., quaternary salt) and polymeric materials (e.g., at least one of fluoropolymer, polyurethane, or siloxane). Antimicrobial dispersed phase may aid in reducing or preventing the growth of algae, mollusks, barnacles, and other marine organisms.

In some embodiments, the dispersed phase comprises a nanodispersed phase (e.g., nanoparticles (e.g., at least one of organic material or inorganic material (e.g., at least one of glass, crystalline ceramic, or glass ceramic))). In some embodiments, the nanoparticles comprise metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride) (e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate) (e.g., at least one of copper salt, cobalt salt, nickel salt, silver salt, gold salt, platinum salt, tin salt, zinc salt, tantalum salt, zirconium salt, or titanium salt) (including mixtures and/or alloys thereof).

In some embodiments, the nanoparticles comprise organic nanoparticles (e.g., silsesquioxane, caged molecules) coated with at least one of metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride) (e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate) (e.g., at least one of copper salt, cobalt salt, nickel salt, silver salt, gold salt, platinum salt, tin salt, zinc salt, tantalum salt, zirconium salt, or titanium salt) (including mixtures and/or alloys thereof).

In some embodiments, the nanoparticles comprise organic nanoparticles (e.g., silsesquioxane, caged molecules) coated with polyatomic ionic materials (e.g., quaternary salt) and polymeric materials (e.g., at least one of fluoropolymer, polyurethane, or siloxane).

In some embodiments, a portion of the nanoparticles are exposed on the anisotropic surface. In some embodiments, at least a portion of the nanoparticles are surface modified.

In some embodiments, the microstructured, anisotropic surfaces comprise rod-like, or needle-like, inorganic particles having an aspect ratio greater than 3:1. Rod-like inorganic particles include chopped carbon fibers, chopped glass fibers, multi-wall carbon nanotubes, and single-wall carbon nanotubes. Exemplary rod-like inorganic particles are coated with at least one of metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride) (e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate) (e.g., at least one of copper salt, cobalt salt, nickel salt, silver salt, gold salt, platinum salt, tin salt, zinc salt, tantalum salt, zirconium salt, or titanium salt) (including mixtures and/or alloys thereof).

In some embodiments, exemplary rod-like inorganic particles are coated with polyatomic ionic materials (e.g., quaternary salt) and polymeric materials (e.g., at least one of fluoropolymer, polyurethane, or siloxane).

In some embodiments, the microstructured, anisotropic surface comprises inorganic particles having sharp edges with sharp (i.e., an edge of the inorganic particle having an included angle of less than 60 degrees). Exemplary inorganic particles having sharp edges include ground glass, quartzite, obsidian, flint, jasper, chalcedony, and synthetic ceramics (e.g., such as the abrasive grain as described in U.S. Pat. No. 8,142,531 (Adefris et. al.), the disclosure of which is incorporated herein by reference).

Exemplary caged molecules for the nanodispersed phase includes polyhedral oligomeric silsesquioxane molecules, which are cage-like hybrid molecules of silicone and oxygen. Polyhedral oligomeric silsesquioxane (POSS) molecules are derived from a continually evolving class of compounds closely related to silicones through both composition and a shared system of nomenclature. POSS molecules have two unique features (1) the chemical composition is a hybrid, intermediate ($RSiO_{1.5}$) between that of silica ($SiO_2$) and silicone ($R_2SiO$), and (2) the molecules are physically large with respect to polymer dimensions and nearly equivalent in size to most polymer segments and coils. Consequently, POSS molecules can be thought of as the smallest particles (about 1-1.5 nm) of silica possible. Unlike silica or modified clays, however, each POSS molecule contains covalently bonded reactive functionalities suitable for polymerization or grafting POSS monomers to polymer chains. In addition, POSS acrylate and methacrylate monomers are suitable for ultraviolet (UV) curing. High functionality POSS acrylates and methacrylates (available, for example, under the trade designations "MA0735" and "MA0736" from Hybrid Plastics, Inc., Hattiesburg, Mass.) are miscible with most of the UV-curable acrylic and urethane acrylic monomers or oligomers to form mechanically durable hardcoat in which POSS molecules form nanophases uniformly dispersed in the organic coating matrix.

In some embodiments, the concentration of the dispersed phase within the polymer matrix is in a range from 0.1 to 50 (in some embodiments, in a range from 0.5 to 40, 1 to 30, or even 2 to 20) weight percent, based on the total weight of the polymer matrix.

In some embodiments, the concentration of the dispersed phase is higher at the anisotropic surface than within the polymer matrix. Higher concentrations of the dispersed phase at the anisotropic surface of the polymer matrix can reduce or prevent growth of algae, mollusks, barnacles, and other marine organisms on the surface of the anisotropic surface structured article.

Exemplary polymers for the polymer matrix include acrylates, polyolefins (e.g., polypropylene (PP) and polyethylene (PE)), (polyvinyl chloride) (PVC), silicones, fluoropolymers (e.g., ethylene tetrafluoroethylene and polyvinylidene fluoride) and poly tetrafluoroethylene hexafluoropropylene vinylidenefluoride (THV), polyurethanes. An exemplary polyurethane polymer, is available, for example, from Lubrizol Advanced Materials, Cleveland, Ohio, under the trade designation "TECOFLEX."

Exemplary melt-processable fluoropolymer copolymers comprising interpolymerized monomers of tetrafluoroethylene include; copolymers of tetrafluoroethylene, hexafluoropropylene, and vinylidene fluoride (e.g., THV); copolymers of tetrafluoroethylene, hexafluoropropylene, and ethylene (e.g., HTE), perfluoroalkoxy copolymers (e.g., PFA), copolymers of tetrafluoroethylene and norbornene; copolymers of ethylene and tetrafluoroethylene (e.g., ETFE): copolymers of tetrafluoroethylene, hexafluoropropylene, and ethylene (e.g., TFEP); or combinations thereof). Exemplary fluoropolymers useful as the polymer matrix include THV available under the trade designation "DYNEON THV 221 GRADE," "DYNEON THV 2030 GRADE," "DYNEON THV 500 GRADE," "DYNEON THV610 GRADE," "DYNEON THV 815 GRADE," "DYNEON PFA 6502N GRADE," "DYNEON HTEX 1705 GRADE," and "DYNEON FEP GRADE," all available from 3M Company, St. Paul, Minn. Fluoropolymers are inherently UV stable and resistant to chemicals. In addition, the low surface energy of fluoropolymers tends to inhibit adhesion of many materials.

In some embodiments, surface structured article described herein have an adhesive on at least a portion the second major surface to enhance adhesion between the second major surface and the surface to be protected (e.g., boat hulls, ship hulls, docks, decks, piers, oil rigs, etc.) from marine organisms (e.g., algae, mollusks, barnacles). Exemplary adhesives include hot melt adhesives and pressure sensitive adhesives (PSAs) (e.g., acrylic, urethane, silicone pressure sensitive adhesives).

Exemplary pressure sensitive adhesives include acrylic pressure sensitive adhesives such as those that comprise a polymer of an acrylate ester of acrylic acid with a non-tertiary alcohol. Multifunctional acrylates, copolymerizable photoinitiators, or combinations of the two may also be present so as to provide some crosslinking, which can contribute to easy removability, better fluids resistance and improved high temperature performance of the drag reduction article. Ultimately, removability is a balance among the peel adhesion, the degree of crosslinking, and the thickness of the bonding layer. Pressure-sensitive adhesives suitable for the bonding layer and methods for their preparation are disclosed in U.S. Pat. No. 6,475,616 (Dietz), the disclosure of which is incorporated herein by reference.

Exemplary thermally or moisture curable adhesives include epoxy resins (epoxide resin+curing agent), acrylates, cyano-acrylates, and urethanes (isocyanate terminated compound+active hydrogen-containing compound). Typically, desirable curable adhesives are non-tacky to the touch after curing, and after curing they cannot be reheated and reflowed. Further, drag reduction articles described herein may be applied to prepreg material (e.g., one containing a curable organic resin matrix and reinforcing material, such as inorganic fibers).

Extrudable hot melt adhesives can be formed into pressure sensitive adhesives, for example, by extrusion blending with tackifiers. Exemplary pressure sensitive adhesives are available, for example, under the trade designations "OCA8171" and "OCA8172" from 3M Company, St. Paul, Minn. Extrudable pressure sensitive adhesives are commercially available, for example, from Kuraray, Osaka, Japan, under the trade designations "LIR-290," "LA2330," "LA2250," "LA2140E," and "LA1114;" and Exxon Mobil, Irving, Tex., under the trade designation "ESCORE." One exemplary tackifier for these extrudable acrylate copolymer adhesives is isopropyl myristate.

Exemplary extrudable adhesives include isobutylene/isoprene copolymers are available, for example, from Exxon Mobil Corp., under the trade designations "EXXON BUTYL 065," "EXXON BUTYL 068," and "EXXON BUTYL 268" (believed to have unsaturation in the range of about 1.05 to about 2.30 mole percent); United Chemical Products, Velizy-Villacoublay, France, under the trade designation "BK-1675N" (believed to have an unsaturation of about 1.7 mole percent); Lanxess, Sarnia, Ontario, Canada, under the trade designation "LANXESS BUTYL 301" (believed to have an unsaturation of about 1.85 mole percent), "LANXESS BUTYL 101-3" (believed to have an unsaturation of about 1.75 mole percent), and "LANXESS BUTYL 402" (believed to have an unsaturation of about 2.25 mole percent); and Kaneka, Osaka, Japan, under the trade designation "SIBSTAR" (available as both diblocks and triblocks with the styrene content believed to vary from about 15 to about 30 mole percent, based on the mole of the copolymer). Exemplary polyisobutylene resins are commercially available, for example, from Exxon Chemical Co., Irving, Tex., under the trade designation "VISTANEX;" Goodrich Corp., Charlotte, N.C., under the trade designation "HYCAR;" and Japan Butyl Co., Ltd., Kanto, Japan, under the trade designation "JSR BUTYL."

In general, suitable polyisobutylenes may have a wide variety of molecular weights and a wide variety of viscosities. In some embodiments, the polyisobutylene has a weight average molecular weight (as measured by Gel Permeation Chromatography using polystyrene standards) of at least about 300,000 (in some embodiments, at least about 400,000, or even at least 500,000 or more) grams per mole. In some embodiments, the polyisobutylene has a weight average molecular weight of less than 300,000 (in some embodiments, up to 280,000, 275,000, 270,000, 260,000, 250,000, 240,000, 230,000, 220,000, 210,000, or up to 200,000) grams per mole. In some embodiments, when defined by the viscosity as measured by intrinsic viscosity at 20° C. in diisobutylene, the polyisobutylene has a viscosity average molecular weight in a range from 100,000 to 10,000,000 (in some embodiments, 500,000 to 5,000,000) grams per mole. Polyisobutylenes of many different molecular weights and viscosities are commercially available. In some embodiments, the molecular weight of the polyisobutylene changes during the process of making a PSA.

In some embodiments, PSAs comprising polyisobutylene, the PSA further comprises a hydrogenated hydrocarbon tackifier (in some embodiments, a poly(cyclic olefin)). In some embodiments, the hydrogenated hydrocarbon tackifier is present in a range from about 5 to about 90 percent by weight, based on the total weight of the PSA composition. In some embodiments, poly(cyclic olefin) is blended with about 10 to about 95 percent by weight polyisobutylene, based on the total weight of the PSA composition. In some embodiments, the PSA comprises hydrogenated hydrocarbon (e.g., poly(cyclic olefin)) tackifier in a range from about 5 to about 70 weight percent, based on the total weight of the PSA composition and about 30 to about 95 weight percent polyisobutylene, based on the total weight of the PSA composition. In some embodiments, a hydrogenated hydrocarbon tackifier (in some embodiments, the poly(cyclic olefin)) is present in an amount of less than 20 (in some embodiments, less than 15) percent by weight, based on the total weight of the PSA composition. For example, the hydrogenated hydrocarbon tackifier (in some embodiments, the poly(cyclic olefin)) may be present in a range from 5 to 19.95, 5 to 19, 5 to 17, 5 to 15, 5 to 13, or even 5 to 10 percent by weight, based on the total weight of the PSA composition. In some embodiments, the PSA is free of acrylic monomers and polyacrylates. Exemplary polyisobutylene PSAs include adhesive compositions comprising a hydrogenated poly(cyclic olefin) and a polyisobutylene resin such as those reported in U.S. Pat. Pub. No. US2007001724 (Fujita et al.), the disclosure of which is incorporated herein by reference.

Exemplary hydrogenated hydrocarbon tackifiers for an adhesive are commercially available, for example, from Arakawa Chemical Industries Co., Ltd., Osaka, Japan, under the trade designations "ARKON P" and "ARKON M." These materials are described in the trade literature as being water white, hydrogenated hydrocarbon resins. Hydrogenated hydrocarbon tackifiers under the trade designation "ARKON P" (e.g., P-70, P-90, P-100, P-115, and P-140) are said to be fully hydrogenated while those under the trade designation "ARKON M" (e.g., M-90, M-100, M-115, and M-135) are partially hydrogenated. The hydrogenated hydrocarbon tackifier available under the trade designation "ARKON P-100" is said to have a number average molecular weight of about 850 grams/mole, a softening point of about 100° C., and a glass transition temperature of about 45° C. The hydrogenated hydrocarbon tackifier available under the trade designation "ARKON P-140" has a number average molecular weight of about 1250 grams/mole, a softening point of about 140° C., and a glass transition temperature of about 90° C. The hydrogenated hydrocarbon tackifier available under the trade designation "ARKON M-90" has a number average molecular weight of about 730 grams/mole, a softening point of about 90° C., and a glass transition temperature of about 36° C. The hydrogenated hydrocarbon tackifier available under the trade designation "ARKON-M-100" has a number average molecular weight of about 810 grams/mole, a softening point of about 100° C., and a glass transition temperature of about 45° C.

Other exemplary hydrogenated hydrocarbon tackifiers for the optional fourth layer are available, for example, from Exxon Chemical, under the trade designations "ESCOREZ 1315," "ESCOREZ 1310LC," "ESCOREZ 1304," "ESCOREZ 5300," "ESCOREZ 5320," "ESCOREZ 5340," "ESCOREZ 5380," "ESCOREZ 5400," "ESCOREZ 5415," "ESCOREZ 5600," "ESCOREZ 5615," "ESCOREZ 5637," and "ESCOREZ 5690."

The "1300" series resins are described in the trade literature as being aliphatic resins with a high softening point. The "ESCOREZ 1315" resin is said to have a weight average molecular weight of about 2200 grams/mole, a softening point in the range of about 112° C. to about 118° C., and a glass transition temperature of about 60° C. The "ESCOREZ 1310LC" resin is said to have a light color, a weight average molecular weight of about 1350 grams/mole, a softening point of about 95° C., and a glass transition temperature of about 45° C. The "ESCOREZ 1304" resin is said to have a weight average molecular weight of about 1650 grams/mole, a softening point in the range of about 97° C. to about 103° C., and a glass transition temperature of about 50° C.

The "5300" series of resins are described in the trade literature as being water white, cycloaliphatic hydrocarbon resins, and have a weight average molecular weight in the range of about 370 grams/mole to about 460 grams/mole, a softening point in the range of about 85° C. to about 140° C., and a glass transition temperature in the range of about 35° C. to about 85° C.

The "5400" series of resins are described in the trade literature as being very light colored cycloaliphatic hydrocarbon resins, and have a weight average molecular weight in the range of about 400 grams/mole to about 430 grams/mole, a softening point in the range of about 103° C. to about 118° C., and a glass transition temperature in the range of about 50° C. to about 65° C.

The "5600" series of resins are described in the trade literature as being very light colored, aromatic modified cycloaliphatic resin where the percent of aromatic hydrogen atoms is in the range of about 6 to about 12 weight percent based on the weight of all the hydrogen atoms in the resins. Further, the "5600" series of resins are said to have a weight average molecular weight in the range of about 480 grams/mole to about 520 grams/mole, a softening point in the range of about 87° C. to about 133° C., and a glass transition temperature in the range of about 40° C. to about 78° C.

Other exemplary suitable hydrogenated hydrocarbon tackifiers for the adhesive layer are available, for example, from Eastman, Kingsport, Tenn., under the trade designations "REGALREZ 1085," "REGALREZ 1094," "REGALREZ 1126," "REGALREZ 1139," "REGALREZ 3102," and "REGALREZ 6108." These resins are described in the trade literature as hydrogenated aromatic pure monomer hydrocarbon resins. They have a weight average molecular weight ranging from about 850 grams/mole to about 3100 grams/mole, a softening temperature in the range of about 87° C. to about 141° C., and a glass transition temperature in the range of about 34° C. to about 84° C. The "REGALEZ 1018" resin can be used in applications that do not generate heat. This tackifying resin has a weight average molecular weight of about 350 grams/mole, a softening point of about 19° C., and a glass transition temperature of about 22° C.

Other exemplary suitable hydrogenated hydrocarbon tackifiers for the optional fourth layer are available, for example, from Cray Valley, Exton, Pa., under the trade designations "WINGTACK 95" and "WINGTACK RWT-7850." The trade literature describes these tackifying resins as synthetic resins obtained by cationic polymerization of aliphatic $C_5$ monomers. The tackifying resin available under the trade designation "WINGTACK 95" is a light-yellow solid with a weight average molecular weight of about 1700 grams/mole, a softening point of 98° C., and a glass transition temperature of about 55° C. The tackifying resin available under the trade designation "WINGTACK RWT-7850" is a light-yellow solid with a weight average molecular weight of about 1700 grams/mole, a softening point of about 102° C., and a glass transition temperature of 52° C.

Other exemplary hydrogenated hydrocarbon tackifiers for the adhesive layer are available, for example, from Eastman, under the trade designations "PICCOTAC 6095-E," "PICCOTAC 8090-E," "PICCOTAC 8095," "PICCOTAC 8595," "PICCOTAC 9095," and "PICCOTAC 9105." The trade literature describes these resins as aromatic modified, aliphatic hydrocarbon resin or as aromatic modified $C_5$ resins. The tackifier available under the trade designation "PICCOTACK 6095-E" has a weight average molecular weight of about 1700 grams/mole and a softening point of about 98° C. The tackifier available under the trade designation "PICCOTACK 8090-E" has a weight average molecular weight of about 1900 grams/mole and a softening point of about 92° C. The tackifier available under the trade designation "PICCOTACK 8095" has a weight average molecular weight of about 2200 grams/mole and a softening point of about 95° C. The tackifier available under the trade designation "PICCOTAC 8595" has a weight average molecular weight of about 1700 grams/mole and a softening point of about 95° C. The tackifier available under the trade designation "PICCOTAC 9095" has a weight average molecular weight of about 1900 grams/mole and a softening point of about 94° C. The tackifier available under the trade designation "PICCOTAC 9105" has a weight average molecular weight of about 3200 grams/mole and a softening point of about 105° C.

In some embodiments, the hydrogenated hydrocarbon tackifier is a hydrogenated poly(cyclic olefin) polymer. Poly(cyclic olefin) polymers generally have low moisture permeability and can impact the adhesive properties of the polyisobutylene resin, for example, by functioning as a tackifier. Exemplary hydrogenated poly(cyclic olefin) polymers include hydrogenated petroleum resins; hydrogenated terpene-based resins (e.g., available from Yasuhara Chemical, Hiroshima, Japan, under the trade designation "CLEARON," in grades P, M, and K); hydrogenated resin or hydrogenated ester-based resins (available for example, from Hercules Inc., Wilmington, Del., under the trade designations "FORAL AX" and "FORAL 105;" and from Arakawa Chemical Industries Co., Ltd., Osaka, Japan, under the trade designations "PENCEL A," "ESTERGUM H," and "SUPER ESTER A"); disproportionate resins or disproportionate ester-based resins (available, for example, from Arakawa Chemical Industries Co., Ltd., under the trade designation "PINECRYSTAL"); a hydrogenated dicyclopentadiene-based resin (e.g., a hydrogenated $C_5$-type petroleum resin obtained by copolymerizing a $C_5$ fraction such as pentene, isoprene, or piperine with 1,3-pentadiene produced through thermal decomposition of petroleum naphtha (available, for example, from Exxon Chemical Co., under the trade designations "ESCOREZ 5300" and "ESCOREZ 5400" and from Eastman Chemical Co., under the trade designation "EASTOTAC H")); a partially hydrogenated aromatic modified dicyclopentadiene-based resin (available, for example, from Exxon Chemical Co., under the trade designation "ESCOREZ 5600"); a resin resulting from hydrogenation of a $C_9$-type petroleum resin obtained by copolymerizing a $C_9$ fraction such as indene, vinyltoluene and α- or β-methylstyrene produced by thermal decomposition of petroleum naphtha (available, for example, from Arakawa Chemical Industries Co., Ltd., under the trade designations "ARCON P" or "ARCON M"); and a resin resulting from hydrogenation of a copolymerized petroleum resin of the above-described $C_5$ fraction and $C_9$ fraction (available, for example, from Idemitsu Petrochemical Co., Tokyo, Japan, under the trade designation "IMARV"). In some embodiments, the hydrogenated poly(cyclic olefin) is a hydrogenated poly(dicyclopentadiene), which may provide advantages to the PSA (e.g., low moisture permeability and transparency).

The hydrogenated hydrocarbon tackifier generally has a solubility parameter (SP value), which is an index for characterizing the polarity of a compound, that is similar to that of the polyisobutylene and exhibits good compatibility (i.e., miscibility) with the polyisobutylene so that a transparent film can be formed. The tackifying resins are typically amorphous and have a weight average molecular weight no greater than 5000 grams/mole. If the weight average molecular weight is greater than about 5000 grams/mole, compatibility with the polyisobutylene material may decrease, tackiness may decrease, or both. The molecular weight is often no greater than 4000 (in some embodiments no greater than 2500, 2000, 1500, 1000, or even no greater than 500; in some embodiments, the molecular weight is in the range of 200 to 5000, 200 to 4000, 200 to 2000 or even 200 to 1000) gram/mole.

PSA layers can be provided by techniques known in the art, such as hot melt extrusion of an extrudable composition comprising the components of the PSA composition. Advantageously, the PSA layer can be made by this process in the absence of solvents. Exemplary methods for making extrudable adhesives are described, for example, in U.S. Pat. Pub. No. 1994/010515 (and PCT Pub. No. WO1995/016754A1) (Leonard et. al.), the disclosures of which are incorporated herein by reference.

In some embodiments, PSAs for the adhesive layer comprise at least one of a UV absorber (UVA), a HALS, or an antioxidant. Exemplary UVAs include those described above in conjunction with multi-layer film substrates (e.g., those available from Ciba Specialty Chemicals Corporation, under the trade designations "TINUVIN 328," "TINUVIN 326," "TINUVIN 783," "TINUVIN 770," "TINUVIN 479," "TINUVIN 928," "TINUVN 1577," and "TINUVIN 1600"). In some embodiments, UVAs, when used, are present in a range from about 0.01 to about 10 percent by weight, based on the total weight of the PSA composition. Exemplary embodiments of UVAs for pressure sensitive adhesives include UVA oligomers as described in PCT Pub. WO2015200669A1 (Olson et. al.), the disclosure of which is incorporated herein by reference.

Exemplary antioxidants include hindered phenol-based compounds and phosphoric acid ester-based compounds, and those described above in conjunction with multi-layer film substrates (e.g., those available from Ciba Specialty Chemicals Corporation, under the trade designations "IRGANOX 1010," "IRGANOX 1076," and "IRGAFOS 126" and butylated hydroxytoluene (BHT)). In some embodiments, antioxidants, when used, are present in a range from about 0.01 to about 2 percent by weight, based on the total weight of the PSA composition.

Exemplary stabilizers include phenol-based stabilizers, hindered amine-based stabilizers (e.g., those described above in conjunction with multi-layer film substrates and those available from BASF, under the trade designation "CHIMASSORB 2020"), imidazole-based stabilizers, dithiocarbamate-based stabilizers, phosphorus-based stabilizers, and sulfur ester-based stabilizers. In some embodiments, such compounds, when used, are present in an amount from about 0.01 to about 3 percent by weight, based on the total weight of the PSA composition.

In some embodiments, surface structured articles described herein are multilayer surface structured films to provide improved interlayer adhesion to the adhesive.

In one exemplary embodiment, the surface structured article comprises a multilayer fluoropolymer film comprising, in order:
a first layer comprising a first polymer, the first polymer comprising at least 35 (in some embodiments, at least 40, 45, 50, 55, 60, 65, 70, 75, or even up to 80; in some embodiments in a range from 35 to 80, or even 35 to 75) mol percent tetrafluoroethylene comonomer, at least 15 (in some embodiments, at least 20, 25, 30, 35, 40, 45, or even up to 50; in some embodiments, in a range from 15 to 50, 15 to 40, or even 15 to 35) mole percent vinylidene fluoride comonomer, and at least 5 (in some embodiments, at least 10, 15, or even at least 20; in some embodiments, in a range from 5 to 20, or even 7 to 15) mol percent hexafluoropropylene comonomer, based on the total mol percent of the first polymer;
a second layer comprising a second polymer, the second polymer comprising at least 50 (in some embodiments, 55, 60, 65, 70, 75, 80, 85, 90, 95, or even 100; in some embodiments, in a range from 50 to 100, 75 to 100, or even 85 to 100) mol percent vinylidene fluoride comonomer, based on the total mol percent of the second polymer; and
a third layer comprising a third polymer, the third polymer comprising at least 50 (in some embodiments, 55, 60, 65, 70, 75, 80, 85, 90, 95, or even 100; in some embodiments, in a range from 50 to 100, 75 to 100, or even 85 to 100) mol percent methylmethacrylate comonomer, based on the total mol percent of the third polymer. Optionally, the third layer comprises a polyurethane. In some embodiments, the third layer comprises 0.1 to 10, 1 to 20, 1 to 10, or even 1 to 5 wt. %

UV absorber, and/or at least 0.05 (in some embodiments, at least 0.1, 0.3, 0.4, 0.5, or even at least 1; in some embodiments, 0.05 to 5, 0.1 to 5, or even 0.1 to 2) wt. % hindered amine light stabilizer (HALS), based on the total mol percent of the third layer. An exemplary embodiment of the third layer of fluoropolymer multilayer surface structured article described herein comprises a UVA oligomer and optional HALS oligomer.

In some embodiments, a primer layer is applied to the second major surface of the surface structured article to improve adhesion of the adhesive to the second major surface of the surface structured article. In some embodiments, the primer layer comprises nanosilica particles. Exemplary primer coatings useful as the primer layer are available under the trade designation "3M AP-115" available from 3M Company. Additional useful nanosilica primers layers are described in U.S. Pat. Pub. No. 20130040126A1 (Pett et. al.), the disclosure of which is incorporated herein by reference.

The silica particles used in the primer coating composition can be of a wide variety of shapes, including spherical or nonspherical (e.g., needle-like, rod-like, string-like, bead-chain-like, nanofilaments, and/or elongated particles). The nonspherical or irregular shaped nanoparticles may result in the formation of voids in the coatings differently from that of spherical or regular shaped nanoparticles. Combinations of spherical and nonspherical silica nanoparticles can be used if desired.

The silica nanoparticles used in this primer composition are dispersions of submicrometer size silica nanoparticles in an aqueous or in a water/organic solvent mixture. The average particle size (i.e., the longest dimension of a particle, which is a diameter of a spherical particle) may be determined using transmission electron microscopy.

Generally, spherical silica nanoparticles have an average primary particle diameter of less than 40 nanometers (in some embodiments, less than 30 nanometers, 25 nanometers, 20 nm, 10 nm, or even less than 5 nm). Although larger nanoparticles can be used if desired (e.g., those having a diameter of 50 nm or greater).

In some embodiments, nonspherical (i.e., acicular) colloidal silica particles may have a uniform thickness of at least 2 nm (in some embodiments, at least 3 nm, 4 nm, or 5 nm, 10 nm 15, nm, or even at least 20 nm) and typically up to 25 nm. They may have a length, $D_1$, of at least 40 nm (in some embodiments, at least 50 nm, 100 nm, 200 nm, 300 nm, or even at least 400 nm), and typically, a length up to 500 nm (as measured by dynamic light-scattering method). The nonspherical (i.e., acicular) colloidal silica particles may have degree of elongation $D_1/D_2$ of 5 to 30, wherein $D_2$ means a diameter in nm calculated by the equation $D_2=2720/S$ and S means specific surface area in $m^2/g$ of the particle, as is disclosed in U.S. Pat. No. 5,221,497 (Watanabe et. al.), the disclosure of which is incorporated herein by reference.

The smaller nanoparticles (i.e., those less than 20 nanometers), generally provide better primer coatings, when acidified, without the need for additives (e.g., tetraalkoxysilanes, surfactants, and organic solvents). In some embodiments, the nanoparticles generally have a surface area greater than 150 $m^2/g$ (in some embodiments, greater than 200, 300, or even greater than 400 $m^2/g$).

In some embodiments, the particles have narrow particle size distributions (i.e., a polydispersity (i.e., particle size distribution) up to 2 (in some embodiments, up to 1.5)). If desired, larger silica particles may be added, in limited amounts that do not deleteriously decrease the coatability of the composition on a selected substrate, and do not reduce the transmissivity and/or the hydrophilicity. Thus, various sizes of particles may be used in combination. In some embodiments, bimodal distributions of particle sizes may be used. For example, particles having an average particle size of at least 50 nm (in some embodiments. 50 nm to 100 nm) may be used in ratios of 0.2:99.8 to 99.8:0.2 relative to the weight of the silica nanoparticles of 40 nm or less. In some embodiments, the larger particles are used in ratios of 1:9 to 9:1 relative to the smaller particles. In some embodiments, particles may be used that have an average particle size of 40 nm or less (in some embodiments, 0.1 wt. % to 20 wt. %) plus particles having an average particle size of 50 nm or greater (in some embodiments, 0 wt. % to 20 wt. %), wherein the sum of the two different particle sizes is 0.1 wt. % to 20 wt. %. Generally, the total weight of silica particles (regardless of size) in a primer composition is at least 0.1 wt. % (in some embodiments, at least 1 wt. %, or even at least 2 wt. %). Generally, the total weight of silica particles (regardless of size) in a primer composition of is up to 40 wt. % (in some embodiments, up to 30 wt. %, 20 wt. % (in some embodiments, up to 10 wt. %, or even 7 wt. %)).

The primer compositions are typically acidified. These acidified aqueous silica nanoparticle primer coating compositions can be coated directly onto hydrophobic organic and inorganic substrates without either organic solvents or surfactants. The wetting property of these inorganic nanoparticle aqueous dispersions on hydrophobic surfaces (e.g., polyethylene terephthalate (PET) or polycarbonate (PC)) is a function of the pH of the dispersions and the $pK_a$ of the acid. The primer coating compositions are coatable on hydrophobic organic substrates when they are acidified with HCl to pH=2 to 3, and even to 4 or 5 in some embodiments. In contrast, the aqueous primer coating compositions bead up on the organic substrates at neutral or basic pH.

Inorganic silica sols in aqueous media are well known in the art and available commercially. Silica sols in water or water-alcohol solutions are available, for example, under the trade designations "LUDOX" from E.I. duPont de Nemours and Co., Inc., Wilmington, Del.; "NYACOL" from Nyacol Co., Ashland, Mass.; and "NALCO" from Ondeo Nalco Chemical Co., Oak Brook, Ill. One exemplary silica sol is available under the trade designation "NALCO 2326" from Ondeo Nalco Chemical Co., as a silica sol with mean particle size of 5 nanometers, pH 10.5, and solid content 15% by weight. Other exemplary commercially available silica nanoparticles include those under the trade designations "NALCO 1115" and "NALCO 1130," from Ondeo Nalco Chemical Co., "REMASOL SP30" from Remet Corp., Utica, N.Y.; and "LUDOX SM" from E.I. Du Pont de Nemours Co., Inc.

Useful nonspherical (i.e., acicular) silica particles include, for example, as an aqueous suspension under the trade designation "SNOWTEX-UP" from Nissan Chemical Industries, Tokyo, Japan. The mixture consists of 20-21 wt. % of nonspherical silica, less than 0.35 wt. % of $Na_2O$ and water. The particles are about 9 nanometers to 15 nanometers in diameter and have lengths of 40 to 300 nanometers. The suspension has a viscosity of <100 mPas at 25° C., a pH of about 9 to 10.5, and a specific gravity of about 1.13 at 20° C. Other useful acicular silica particles include aqueous suspensions under the trade designations "SNOWTEX-PS-S" and "SNOWTEX-PS-M" by Nissan Chemical Industries, having a morphology of a string of pearls. The mixture consists of 20-21 wt. % of silica (in some embodiments, less than 0.2 wt. %) of $Na_2O$, and water. The particles under the trade designation "SNOWTEX-PS-M" are about 18 to 25 nanometers in diameter and have lengths of 80 to 150 nanometers. The particle size is 80 to 150 by dynamic light scattering methods. The suspension has a viscosity of <100 mPas at 25° C., a pH of about 9 to 10.5, and a specific gravity of about 1.13 at 20° C. The particles under the trade designation "SNOWTEX-PS-S" have a particle diameter of 10-15 nm and a length of 80-120 nm.

Non-aqueous or partially-aqueous silica sols (also referred to as silica organosols) may also be used, wherein the liquid phase is an organic solvent, or an aqueous organic solvent. It has been observed that sodium stabilized silica nanoparticles should first be acidified prior to dilution with an organic solvent (e.g., ethanol). Dilution prior to acidification may yield poor or non-uniform coatings. Ammonium stabilized silica nanoparticles may generally be diluted and acidified in any order.

The primer coating composition typically contains at least one acid having a $pK_a$ ($H_2O$) of less than or equal to 3.5 (in some embodiments, less than 2.5, 2, 1, or even less than 0). Exemplary acids include both organic and inorganic acids, such as oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, and $CF_3CO_2H$. In some embodiments, it is desirable to provide a mixture of an organic and inorganic acid. In some embodiments, a mixture of acids comprising those having a $pK_a$ less than or equal to 3.5 (in some embodiments, less than 2.5, 2, 1, or even less than 0), optionally with minor amounts of other acids having $pK_a$s greater than 0. Weaker acids having a $pK_a$ of greater than 4 (e.g., acetic acid), do not provide a uniform coating having the desirable properties of transmissivity and/or durability. In particular, primer coating compositions with weaker acids (e.g., acetic acid) typically bead up on the surface of a substrate.

The primer coating composition generally contains sufficient acid to provide a pH of less than 5 (in some embodiments, less than 4, or even less than 3). In some embodiments, it may be desirable to adjust the pH of the coating composition to pH 5-6 after first reducing the pH to substantially less than 5. This may aid coating pH-sensitive substrates.

Tetra-alkoxy coupling agents, particularly tetra-alkoxysilanes (e.g., tetra-ethylorthosilicate (TEOS)), and oligomeric forms of tetraalkoxysilane (e.g., alkyl polysilicates (e.g., poly(diethoxysiloxane))), may also be useful to improve binding between silica nanoparticles. The desirable amount of coupling agent can be determined experimentally and may be dependent, for example, on the coupling agent's identity, molecular weight, and refractive index. The coupling agent(s), when present, is typically added to the coating composition at levels of up to 50 wt. %, (in some embodiments up to 40 wt. %, 30 wt. %, 20 wt. %, or even up to 15 wt. %; in some embodiments, in a range from 0.1 wt. % to 50 wt. %, 1 wt. % to 25 wt. %, or even 1 wt. % to 15 wt. %) based on the total (solids) weight of the coating composition.

The primer typically provides the surface coated thereon with a continuous network of acid-sintered silica nanoparticles agglomerates. In some embodiments, the particles have an average primary particle size of less than 40 nanometers (in some embodiments, less than 30 nanometers, or even less than 20 nanometers). The average particle size may be determined using transmission electron microscopy. As used herein, the term "continuous" refers to covering the surface of the substrate with virtually no discontinuities or gaps in the areas where the gelled network is applied. The term "network" refers to an aggregation or agglomeration of nanoparticles linked together to form a porous three-dimensional network. The term "primary particle size" refers to the average size of unagglomerated single particles of silica.

In some embodiments, surface structured article described herein further comprising a substrate attached to at least a portion of the second major surface. Exemplary substrates include steel, aluminum, wood, paint, epoxy gel coatings, and polyester fiberglass composites.

In some embodiments, surface structured article described herein further comprises a fluorochemical repellent layer on the anisotropic surface. Fluorochemical repellents include quaternary salts (e.g., antistats and ionic liquids). Exemplary fluorochemical repellent additives include fluorinated imide salts available, for example, under the trade designations "3M HQ-115" and "3M FC-4400" from 3M Company.

In another aspect, the present disclosure provides a method of making surface structured articles described herein, the method comprising:

providing a polymer matrix comprising a dispersed phase; and anisotropically etching the polymer matrix using plasma to form the anisotropic surface. In some embodiments, the polymer matrix is etched to a depth (e.g., at least 100 nm) into the dispersed phase surface.

In another aspect, the present disclosure provides a method of making surface structured articles described herein, the method comprising:

providing a polymer matrix comprising a dispersed phase; and etching at least a portion of the polymer matrix to expose at least a portion of the dispersed phase using plasma to form a random structured surface.

The surface structure of the surface structured article described herein can be prepared by several methods. For example, a polymeric material may be extruded through a die capable of forming the patterned surface. In another example, the patterned surface may be formed by embossing techniques utilizing heat and/or pressure.

An example for making the surface structured article described herein utilizing an embossing technique comprises extruding or casting a polymeric film material and contacting the polymeric film while it is still hot with an engraved, chilled cylinder which bears the negative structure of the desired patterned surface. The polymeric film may then be cooled on the cylinder. The substrate surface on which the coating composition is coated may have a structured surface provided when the substrate is made, or may be added to the surface of the substrate (e.g., provided by techniques known in the art including extrusion replication, embossing, and casting, followed by, if needed, curing).

In some embodiments, the structured surface is a microstructured surface formed by an extrusion replication procedure utilizing a tool that imparts a negative structure in the polymer surface. The tooling can be in any of a variety of forms and materials. Typically, the tooling is a sheet, roll, belt, or roll of surface structured film made of metal or polymer. For metal tools, the metal is generally diamond-machined, embossed, knurled, sandblasted, etc. to form the surface structure. The structured polymer surface is generally formed by extrusion replication where a thermoplastic resin such as a fluoropolymer extruded through a die and into a nip with a machined metal tool roll and a rubber roll. The molten polymer is quenched while in contact with the tool surface which then releases from the tool roll and is wound on a roll.

Another technique for making structured surfaces is to coat UV curable acrylate functional resins against a tool followed by removal of the cross-linked structured film from the tool.

Yet another technique for making structured surfaces is to coat thermally curable urethane functional resins against a tool followed by removal of the cross-linked structured film from the tool. This polyurethane layer can be prepared from the condensation polymerization of a reaction mixture that comprises a polyol, a polyisocyanate, and a catalyst.

In some embodiments where the structured surface is provided by etching at least a portion of the polymer matrix to expose at least a portion of the dispersed phase using plasma, the surface is plasma treated a second time. In some embodiments, the plasma treatment is provided via a roll-to-roll using cylindrical reactive ion etching (RIE). In some embodiments, the etching is carried out at a pressure of about 1 mTorr to about 20 mTorr. In some embodiments, the plasma is a $C_3F_8/O_2$ plasma.

A typical reactive ion etching system consists of a vacuum chamber with two parallel electrodes, the "powered electrode" (or "sample carrier electrode") and the counter-electrode, which creates an electric field that accelerates ions toward. The powered electrode is situated in the bottom portion of the chamber and is electrically isolated from the rest of the chamber. The article to be nanostructured is placed on the powered electrode. Reactive gas species can be added to the chamber, for example, through small inlets in the top of the chamber and can exit to the vacuum pump system at the bottom of the chamber. Plasma is formed in the system by applying a radio frequency (RF) electromagnetic field to the powered electrode. The field is typically produced using a 13.56 MHz oscillator, although other RF sources and frequency ranges may be used. The gas molecules are broken and can become ionized in the plasma and accelerated toward the powered electrode to etch the sample. The large voltage difference causes the ions to be directed toward the powered electrode where they collide with the sample to be etched. Due to the (mostly) vertical delivery of the ions, the etch profile of the sample is substantially anisotropic. In some embodiments, the powered electrode is smaller than the counter-electrode creating a large voltage potential across the ion sheath adjacent the powered electrode. In some embodiments, the etching is into the dispersed phase surface (e.g., at least 100 nm).

The reactive ion etching process pressure is typically maintained in a range from about 1 mTorr to about 20 mTorr (in some embodiments, about 1 mTorr to about 10 mTorr). This pressure range is very conducive for generation of the anisotropic nanostructure in a cost-effective manner. When the pressure is above about 20 mTorr, the etching process becomes more isotropic because of the collisional quenching of the ion energy. Similarly, when the pressure goes below about 1 mTorr, the etching rate becomes very low because of the decrease in number density of the reactive species. Also, the gas pumping requirements become very high.

The power density of the RF power of the etching process is typically in the range of about 0.1 watt/cm$^3$ to about 1.0 watt/cm$^3$ (in some embodiments, about 0.2 watt/cm$^3$ to about 0.3 watt/cm$^3$).

The type and amount of gas utilized will depend upon the matrix material to be etched. The reactive gas species need to selectively etch the matrix material rather than the dispersed phase. Additional gases may be used for enhancing the etching rate of hydrocarbons or for the etching of non-hydrocarbon materials. For example, fluorine containing gases (e.g., perfluoromethane, perfluoroethane, perfluoropropane, sulfurhexafluoride, and nitrogen trifluoride) can be added to oxygen or introduced by themselves to etch materials (e.g., silica, tungsten carbide, silicon nitride, and amorphous silicon). Chlorine-containing gases can likewise be added for the etching of materials such as aluminum, sulfur, boron carbide, and semiconductors from the Group II-VI (including cadmium, magnesium, zinc, sulfur, selenium, tellurium, and combinations thereof) and from the Group III-V (including aluminum, gallium, indium, arsenic, phosphorous, nitrogen, antimony, or combinations thereof). Hydrocarbon gases (e.g., methane) can be used for the etching of materials (e.g., gallium arsenide, gallium, and indium). Inert gases, particularly heavy gases such as argon can be added to enhance the anisotropic etching process.

Methods for making structured surfaces described herein can also be carried out using a continuous roll-to-roll process. For example, the method can be carried out using "cylindrical" reactive ion etching. Cylindrical reactive ion etching utilizes a rotating cylindrical electrode to provide anisotropically etched structures on the surface of the article.

In general, cylindrical reactive ion etching for making the structured articles described herein can be described as follows. A rotatable cylindrical electrode ("drum electrode") powered by radio frequency (RF) and a grounded counter-electrode are provided inside a vacuum vessel. The counter-electrode can comprise the vacuum vessel itself. Gas comprising an etchant is fed into the vacuum vessel, and plasma is ignited and sustained between the drum electrode and the grounded counter-electrode. The conditions are selected so that sufficient ion bombardment is directed perpendicular to the circumference of the drum. A continuous article comprising the matrix containing the dispersed phase can then be wrapped around the circumference of the drum and the matrix can be etched in the direction normal to the plane of the article. The matrix can be in the form of a coating on an article (e.g., on a film or web, or the matrix can be the article itself). The exposure time of the article can be controlled to obtain a predetermined etch depth of the resulting structure. The process can be carried out at an operating pressure of about 10 mTorr.

In some embodiments, the second major surface of the surface structured article is treated with plasma to provide and anisotropic surface for improving adhesion of the adhesive to the second major surface of the surface structured article.

Embodiments of surface structured articles described herein are useful, for example, for marine applications (e.g., surfaces in contact with water (e.g., ocean water)) such as boats, ships, piers, docks, oil rigs, decks, and roofing materials.

EXEMPLARY EMBODIMENTS

1A. A surface structured article comprising a polymer matrix and a dispersed phase, the article having first and second opposed major surfaces, at least a portion of the first major surface is a microstructured, anisotropic surface comprises features having at least one dimension in a range from 1 micrometer to 500 micrometers (in some embodiments, in a range from 10 micrometers to 500 micrometers, or even 25 micrometers to 500 micrometers), wherein the dispersed phase comprises an antimicrobial material, and wherein at least a portion of the dispersed phase is present on the microstructured, anisotropic surface.

2A. The surface structured article of Exemplary Embodiment 1A, wherein the antimicrobial material comprises at least one of metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride) (e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate) (e.g., at least one of copper salt, cobalt salt, nickel salt, silver salt, gold salt, platinum salt, tin salt, zinc salt, tantalum salt, zirconium salt, or titanium salt) (including mixtures and/or alloys thereof).

3A. The surface structured article of Exemplary Embodiment 1A, wherein the antimicrobial material comprises at least one of copper, cobalt, nickel, zinc, silver, gold, platinum, copper oxide, cobalt oxide, nickel oxide, zinc oxide, silver oxide, tin oxide, tantalum oxide, zirconium oxide, titanium dioxide, copper silicate, cobalt silicate, nickel silicate, silver silicate, gold silicate, platinum silicate, zinc silicate, zirconium silicate, copper sulfide, cobalt sulfide, nickel sulfide, silver sulfide, gold sulfide, platinum sulfide, tin sulfide, zinc sulfide, tantalum sulfide, zirconium sulfide, titanium sulfide, copper halide, cobalt halide, nickel halide, silver halide, gold halide, platinum halide, tin halide, zinc halide, tantalum halide, zirconium halide, titanium halide, copper salt, cobalt salt, nickel salt, silver salt, gold salt, platinum salt, tin salt, zinc salt, tantalum salt, zirconium salt, or titanium salt (including mixtures and/or alloys thereof).

4A. The surface structured article of any preceding A Exemplary Embodiment, wherein the antimicrobial material comprises at least one of a polyatomic ionic material (e.g., quaternary salt) or polymeric material (e.g., at least one of fluoropolymer, polyurethane, or siloxane).

5A. The surface structured article of any preceding A Exemplary Embodiment, wherein the features comprise linear prisms, and the at least one dimension is a peak to valley height of the feature, wherein the peak to valley height is in a range from 1 micrometers to 500 micrometers (in some embodiments, in a range from in a range from 10 micrometers to 500 micrometers, 25 micrometers to 500 micrometers, 25 micrometers to 250 micrometers, 25 micrometers to 100 micrometers, or even 25 micrometers to 75 micrometers).

6A. The surface structured article of any of Exemplary Embodiments 1A to 4A, wherein the microstructured, anisotropic surface comprises linear grooves with a peak to valley height in a range from 1 micrometer to 500 micrometers (in some embodiments, in a range from 1 micrometer to 250 micrometers, 1 micrometer to 100 micrometers, 1 micrometer to 50 micrometers, 1 micrometer to 25 micrometers, 1 micrometer to 10 micrometers, 1 micrometer to 5 micrometers, or even 100 micrometers to 500 micrometers).

7A. The surface structured article of any of Exemplary Embodiments 1A to 4A, wherein the features have a major dimension substantially collinear with a first axis and a minimum dimension substantially collinear with a second axis.

8A. The surface structured article of any Exemplary Embodiments 1A to 4A, wherein the features comprise ovoid (e.g., ellipsoids, spheroids, or egg-shaped) shaped features.

9A. The surface structured article of any preceding A Exemplary Embodiment, further comprising a nanostructured surface on the micro structured, anisotropic surface.

10A. The surface structured article of Exemplary Embodiment 9A, wherein the nanostructured surface comprises nanoscale features having a height to width ratio in a range from 0.1:1 to 5:1 (in some embodiments, in a range from 0.1:1 to 3:1, or even 0.25:1 to 2:1).

11A. The surface structured article of Exemplary Embodiment 10A, wherein the nanoscale features comprise nanopillars.

12A. The surface structured article of any preceding A Exemplary Embodiment, wherein the microstructured, anisotropic surface comprises inorganic material (e.g., at least one of (including mixtures and/or alloys thereof) metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, or fluoride; e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate; e.g., at least one of copper salt, cobalt salt, nickel salt, silver salt, gold salt, platinum salt, tin salt, zinc salt, tantalum salt, zirconium salt, or titanium salt)).

13A. The surface structured article of any of Exemplary Embodiments 1A to 12A, wherein the microstructured, anisotropic surface comprises inorganic material (e.g., at least one of (including mixtures and/or alloys thereof) copper, cobalt, nickel, zinc, silver, gold, platinum, copper oxide, cobalt oxide, nickel oxide, zinc oxide, silver oxide, tin oxide, tantalum oxide, zirconium oxide, titanium dioxide, copper silicate, cobalt silicate, nickel silicate, silver silicate, gold silicate, platinum silicate, zinc silicate, zirconium silicate, copper sulfide, cobalt sulfide, nickel sulfide, silver sulfide, gold sulfide, platinum sulfide, tin sulfide, zinc sulfide, tantalum sulfide, zirconium sulfide, titanium sulfide, copper halide, cobalt halide, nickel halide, silver halide, gold halide, platinum halide, tin halide, zinc halide, tantalum halide, zirconium halide, titanium halide, copper salt, cobalt salt, nickel salt, silver salt, gold salt, platinum salt, tin salt, zinc salt, tantalum salt, zirconium salt, or titanium salt).

14A. The surface structured article of any preceding A Exemplary Embodiment, wherein the microstructured, anisotropic surface comprises polyatomic ionic compounds (e.g., quaternary salt, polyhedral oligomeric silsesquioxane (POSS)), and polymeric material (e.g., at least one of fluoropolymer, polyurethane, or siloxane).

15A. The surface structured article of any preceding A Exemplary Embodiment, wherein the dispersed phase comprises nanoparticles (e.g., at least one of organic material or inorganic material (e.g., at least one of glass, crystalline ceramic, or glass ceramic)).

16A. The surface structured article of Exemplary Embodiment 14A, wherein the nanoparticles comprise at least one of metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride) (e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate) (e.g., at least one of copper salt, cobalt salt, nickel salt, silver salt, gold salt, platinum salt, tin salt, zinc salt, tantalum salt, zirconium salt, or titanium salt) (including mixtures and/or alloys thereof).

17A. The surface structured article of Exemplary Embodiment 14A, wherein the nanoparticles comprise at least one of copper, cobalt, nickel, zinc, silver, gold, platinum, copper oxide, cobalt oxide, nickel oxide, zinc oxide, silver oxide, tin oxide, tantalum oxide, zirconium oxide, titanium dioxide, copper silicate, cobalt silicate, nickel silicate, silver silicate, gold silicate, platinum silicate, zinc silicate, zirconium silicate, copper sulfide, cobalt sulfide, nickel sulfide, silver sulfide, gold sulfide, platinum sulfide, tin sulfide, zinc sulfide, tantalum sulfide, zirconium sulfide, titanium sulfide, copper halide, cobalt halide, nickel halide, silver halide, gold halide, platinum halide, tin halide, zinc halide, tantalum halide, zirconium halide, titanium halide, copper salt, cobalt salt, nickel salt, silver salt, gold salt, platinum salt, tin salt, zinc salt, tantalum salt, zirconium salt, or titanium salt (including mixtures and/or alloys thereof).

18A. The surface structured article of any of Exemplary Embodiments 15A to 17A, wherein the nanoparticles comprise organic nanoparticles (e.g., silsesquioxane, caged molecules) coated with at one metal oxide (e.g., at least one of metal (e.g., at least one of copper, cobalt, nickel, zinc, silver, gold, or platinum), oxide (e.g., at least one of copper oxide (including at least one of cuprous oxide or cupric oxide), cobalt oxide, nickel oxide, zinc oxide, silver oxide, tin oxide, tantalum oxide, zirconium oxide, or titanium dioxide), silicate (e.g., at least one of copper silicate, cobalt silicate, nickel silicate, silver silicate, gold silicate, platinum silicate, zinc silicate, or zirconium silicate), sulfide (e.g., at least one of copper sulfide, cobalt sulfide, nickel sulfide, silver sulfide, gold sulfide, platinum sulfide, tin sulfide, zinc sulfide, tantalum sulfide, zirconium sulfide, or titanium sulfide), halide (e.g., at least one of chloride, iodide, bromide, and/or fluoride; e.g., at least one of copper halide, cobalt halide, nickel halide, silver halide, gold halide, platinum halide, tin halide, zinc halide, tantalum halide, zirconium halide, or titanium halide), or salt (e.g., at least one of nitrate, sulfate, stearate, succinate, salicylate, phosphate, or carbonate; e.g., at least one of copper salt, cobalt salt, nickel salt, silver salt, gold salt, platinum salt, tin salt, zinc salt, tantalum salt, zirconium salt, or titanium salt)) (including mixtures and/or alloys thereof).

19A. The surface structured article of any of Exemplary Embodiments 15A to 17A, wherein the nanoparticles comprise organic nanoparticles (e.g., silsesquioxane, caged molecules) coated with at least one of copper, cobalt, nickel, zinc, silver, gold, platinum, copper oxide, cobalt oxide, nickel oxide, zinc oxide, silver oxide, tin oxide, tantalum oxide, zirconium oxide, titanium dioxide, copper silicate, cobalt silicate, nickel silicate, silver silicate, gold silicate, platinum silicate, zinc silicate, zirconium silicate, copper sulfide, cobalt sulfide, nickel sulfide, silver sulfide, gold sulfide, platinum sulfide, tin sulfide, zinc sulfide, tantalum sulfide, zirconium sulfide, titanium sulfide, copper halide, cobalt halide, nickel halide, silver halide, gold halide, platinum halide, tin halide, zinc halide, tantalum halide, zirconium halide, titanium halide, copper salt, cobalt salt, nickel salt, silver salt, gold salt, platinum salt, tin salt, zinc salt, tantalum salt, zirconium salt, or titanium salt (including mixtures and/or alloys thereof).

20A. The surface structured article of any of Exemplary Embodiments 15A to 19A, wherein a portion of the nanoparticles are exposed on the anisotropic surface.

21A. The surface structured article of any of Exemplary Embodiments 15A to 19A, wherein at least a portion of the nanoparticles are surface modified.

22A. The surface structured article of any preceding A Exemplary Embodiment, wherein the concentration of the dispersed phase within the polymer matrix is in a range from 0.1 to 50 (in some embodiments, in a range from 0.5 to 40, 1 to 30, or even 2 to 20) weight percent, based on the total weight of the polymer matrix.

23A. The surface structured article of any preceding A Exemplary Embodiment, wherein the concentration of the dispersed phase is higher at the anisotropic surface than within the polymer matrix.

24A. The surface structured article of any preceding A Exemplary Embodiment, the polymer matrix comprises a fluoropolymer.

25A. The surface structured article of any preceding A Exemplary Embodiment having an adhesive on at least a portion the second major surface.

26A. The surface structured article of any preceding A Exemplary Embodiment, further comprising a substrate attached to at least a portion of the second major surface.

27A. The surface structured article of any preceding A Exemplary Embodiment, wherein the article further comprises a fluorochemical repellent layer on the anisotropic surface.

28A. The surface structured article of any preceding A Exemplary Embodiment having a microstructured-patterned surface having spaced-apart peaks, wherein the peaks each have a base width, wherein there is spacing between peaks, and wherein the peak-to-peak spacing is greater than the base width of the peak (e.g., having 80-micrometer tall linear prism features, an 80-micrometer base, and 160 micrometers between peaks).

1B. A method of making the surface structured article of any preceding A Exemplary Embodiment, the method comprising:
providing a polymer matrix comprising a dispersed phase; and anisotropically etching the polymer matrix using plasma to form the anisotropic surface.

2B. The method of Exemplary Embodiment 1B, wherein the polymer matrix is etched to a depth (e.g., at least 100 nm) into the dispersed phase surface.

1C. A method of making the surface structured article of any preceding A or B Exemplary Embodiment, the method comprising:
providing a polymer matrix comprising a dispersed phase; and
etching at least a portion of the polymer matrix to expose at least a portion of the dispersed phase using plasma to form a random structured surface.

2C. The method of Exemplary Embodiment 1C, further comprising treating the structured surface with plasma a second time.

3C. The method of either claim Exemplary Embodiment 1C or 2C, wherein the method is performed roll-to-roll using cylindrical reactive ion etching.

4C. The method of any preceding C Exemplary Embodiment, wherein the etching is carried out at a pressure of about 1 mTorr to about 20 mTorr.

5C. The method of any preceding C Exemplary Embodiment, wherein the plasma is a $C_3F_8/O_2$ plasma.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Micro-Algae Growth and Adhesion Tests

Testing for micro-algae growth was conducted by the Center for Nanoscale Science and Engineering at North Dakota State University in accordance with the methods used in the Biofouling journal article entitled "Combinatorial Materials Research Applied to the Development of New Surface Coatings XIII; An Investigation of Polysiloxane Anti-Microbial Coatings Containing Tethered Quaternary Ammonium Salt Groups," Journal of Combinatorial Chemistry, 2009, Volume 11, No. 6, and "Combinatorial Materials Research Applied to the Development of New Surface Coatings V; Application of a Spinning Water-Jet for the Semi-High Throughput Assessment of the Attachment Strength of Marine Fouling Algae," Biofouling, Vol. 23, No. (2), pp. 121-130, 2007, the disclosures of which are incorporated herein by reference.

The general procedure for micro-algae growth and adhesion testing was as follows:

1) Microalgae analysis was carried out after 14 days of water immersion.
2) Leachate toxicity was assessed by introducing algae into overnight extracts (artificial sea water with nutrients) of treatment and evaluating growth after 48 hours via fluorescence of chlorophyll. Growth in coating leachates was reported as a fluorescence ratio to a positive growth control (fresh nutrient medium). A negative growth controls (medium+bacteria+triclosan) was also included in the analysis.
3) For algal biofilm growth, algae were diluted to and optical density (OD) of 0.03 at 660 nm in artificial sea water (ASW) supplemented with nutrients. 1.0 ml was added to each well of the plate and allowed to incubate statically for 48 hours at 18° C. in an illuminated growth cabinet. Algal biofilm was measured by fluorescence measurement of chlorophyll via dimethylsulfoxide (DMSO) extracts and was reported as fluorescence intensity (relative fluorescence units).
4) Initial cell attachment of algae was assessed before water jet adhesion analysis. Algae were diluted to and OD of 0.03 at 660 nm in ASW supplemented with nutrients. 1 ml was added to each well of the plate and allowed to incubate statically for 2 hours to facilitate cell attachment. Algal cell attachment was quantified by fluorescence measurement of DMSO extracts of chlorophyll. Cell attachment was reported as fluorescence intensity (relative fluorescence units).
5) Water jet adhesion was carried out after 2 hours of initial cell attachment. The first column of each plate was not treated and served as the measure of cell attachment after 2 hours. The second and third column of each coating was jetted for 10 seconds at a pressure of 68.95 kilopascals (10 psi) and 137.9 kilopascals (20 psi), respectively. Algal adhesion was reported as a function of biomass remaining on the material surface after treatment with each pressure indicated above.

Comparative Example A

A multilayer polymeric film was made using a 3 layer multi-manifold die to coextrude a first layer of a fluoropolymer blend (fluoropolymer obtained under the trade designation "FLUOROPLASTIC GRANULES THV221GZ" from 3M Company, St. Paul, Minn.) blended with 20 wt. % cuprous oxide (obtained under the trade designation "CHEM COPP HP III ULTRAFINE" from American Chemet Corporation, Helena, Mont.) having a mean particle size of 1.8 micrometers, a second layer of a fluoropolymer (obtained under the trade designation "3M DYNEON FLUOROPLASTIC GRANULES PVDF 11010/0000" from 3M Company), and a third layer of a 50:50 blend of polymethylmethacrylate (PMMA) butylacrylate copolymer (obtained from Kuraray Ltd., Osaka, Japan, under the trade designation "LA4285") and PMMA ultraviolet absorber (UVA) master batch obtained from Sukano Polymers Corporation, Duncan, S.C., under the trade designation "TA11-10 MB03". The 50:50 blend of PMMA butylacrylate copolymer was fed to the bottom manifold of the multi-manifold die with a 25-mm twin screw extruder at 1.8 kg/hr. (4 lbs./hr.). The fluoropolymer ("3M DYNEON FLUOROPLASTIC GRANULES PVDF 11010/0000") was fed to the center manifold of the multi-manifold die with a 31-mm single screw extruder at 1.8 kg/hr. (4 lbs./hr.). The fluoropolymer blend was fed to the top manifold of multi-manifold die with a 31-mm single screw extruder at 1.8 kg/hr. (4 lbs./hr.). The multilayer polymeric film was cast onto a chilled roll at 5.54 meters/minute (18 fpm) to a thickness of 75 micrometers.

Figure 4:
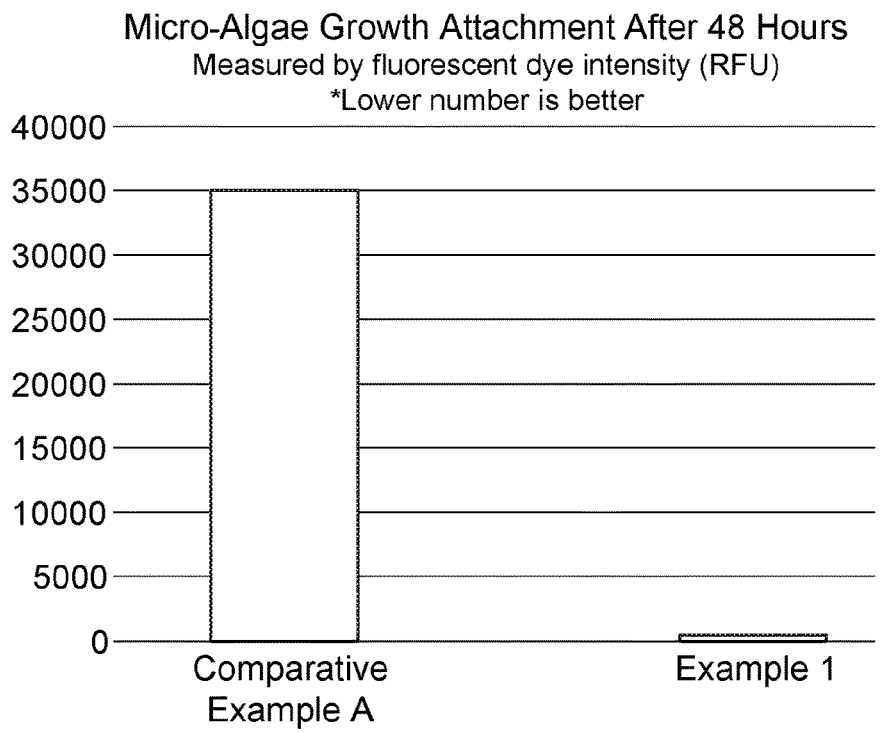
FIG. 4 is a chart illustrating results of the Micro-Algae Growth Attachment Test for Comparative Example A and Example 1.

The resulting film was evaluated using the Micro-Algae Growth and Adhesion Test. After 48 hours of exposure to micro-algae suspended in salt water, some micro-algae attachment was observed by fluorescent dye intensity as shown in FIG. 4.

Example 1

A multilayer polymeric film was made as described in Comparative Example A, and then further processed as follows. The outer major surface of the first layer of the multilayer polymeric film was reactive ion etched to expose the cuprous oxide dispersed particles in the fluoropolymer matrix. Rolls of the polymeric film were mounted within the chamber, the film wrapped around the drum electrode and secured to the take up roll on the opposite side of the drum. The unwind and take-up tensions were maintained at 13.3 N (3 pounds). The chamber door was closed and the chamber pumped down to a base pressure of $5\times10^{-4}$ mTorr. Oxygen was then introduced into the chamber. The operating pressure was nominally 10 mTorr. Plasma was generated by applying a power of 5500 watts of radio frequency energy to the drum. The drum was rotated so that the film was transported at a desired speed.

The resulting film was evaluated using the Micro-Algae Growth and Adhesion Tests. After 48 hours of exposure to micro-algae suspended in salt water, no micro-algae attachment was observed by fluorescent dye intensity as shown in FIG. 4.

Example 2

A multilayer polymeric film was made as described in Comparative Example A, and then further processed as follows.

Figure 5:
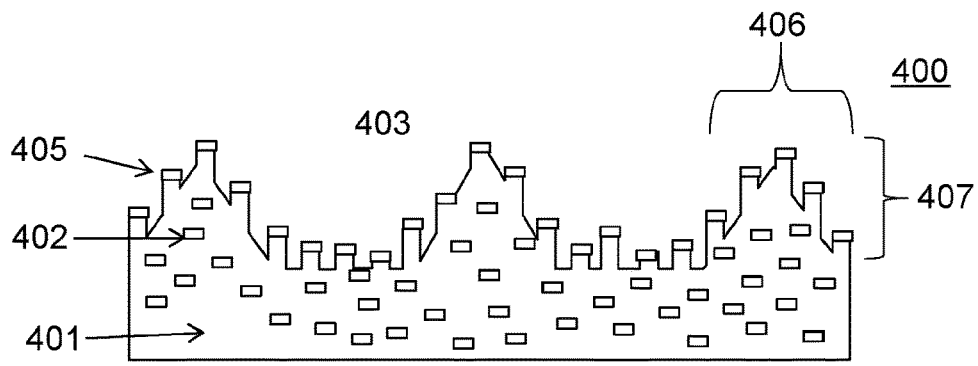
FIG. 5 is a cross-section of an exemplary surface structured article described herein.

A surface structure on the multilayer polymeric film was formed by contacting the outer major surface of the first layer of the multilayer polymeric film with a patterned casting roll at 82° C. and using a rubber nip roll applying a nip force of 5.965 kg per cm (33 pounds per lineal inch) of film width and a line speed of 5.5 meters per minute (18 feet per minute). Patterned casting roll had 80-micrometer tall linear prism features having an 80-micrometer base and spaced apart by 80 micrometers as shown in FIG. 5. The included peak angle on the microreplicated features was 53 degrees. Referring to FIG. 5, top surface 503 of surface structured article 500 had polymer matrix 501 and dispersed phase 502. At least a portion of first major surface 503 was a microstructured, anisotropic surface 505. Microstructured, anisotropic surface 505 had features 506 having at least one dimension 507 in a range from 70 micrometers to 90 micrometers. Dispersed phase 502 comprised an antimicrobial material. At least a portion of dispersed phase 502 was present on microstructured, anisotropic surface 505. Polymer tie layer is shown as 508 and additional polymer tie layer is shown as 509.

The resulting surface structured multilayer polymeric film could then be reactive ion etched as described in Example 1.

Example 3

Figure 6:
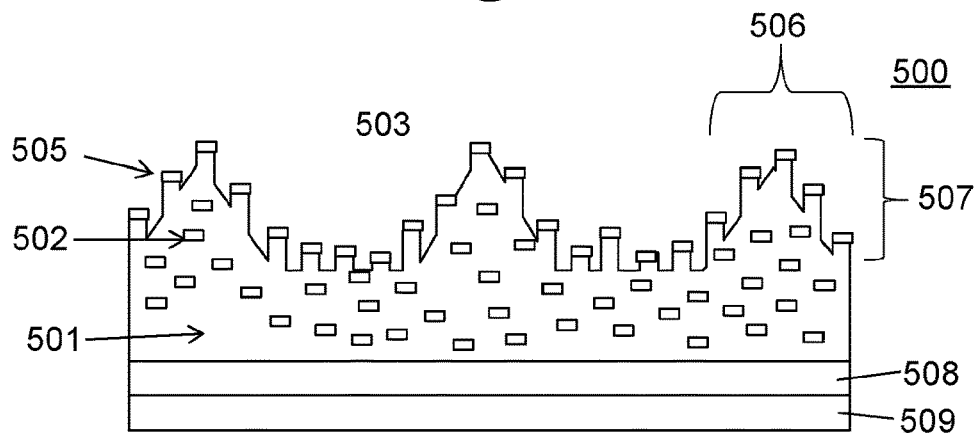
FIG. 6 is a cross-section of an exemplary surface structured article described herein.

A microreplicated multilayer film was made as described in Example 2. An acrylate pressure sensitive adhesive (available from 3M Company under the trade designation "OCA8171") was laminated to the film for adhesion to other surfaces. Referring to FIG. 6, top surface 603 of surface structured article 600 had polymer matrix 601, and dispersed phase 602. At least a portion of first major surface 603 is a microstructured, anisotropic surface 605. Microstructured, anisotropic surface 605 has features 606 having at least one dimension 607 in a range from 70 micrometers to 90 micrometers. Dispersed phase 602 comprises an antimicrobial material. Polymer tie layer is shown as 608 and additional polymer tie layer is shown as 609. At least a portion of dispersed phase 602 is present on microstructured, anisotropic surface 605. Adhesive is shown as layer 610.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A surface structured article comprising a polymer matrix and a dispersed phase, the article having first and second opposed major surfaces, wherein the article comprises a multilayer fluoropolymer film comprising in order:
   a first layer comprising a first polymer, the first polymer comprising at least 35 mole percent tetrafluoroethylene comonomer, at least 15 mole percent vinylidene fluoride comonomer, and at least 5 mole percent hexafluoropropylene comonomer, based on the total mole percent of the first polymer;
   a second layer comprising polyvinylidene fluoride; and
   a third layer comprising a third polymer, the third polymer comprising at least 50 mole percent of a methyl methacrylate comonomer, based on the total mole percent of the third polymer, wherein at least a portion of the first major surface is a microstructured, anisotropic surface comprising features having at least one dimension in a range from 1 micrometer to 500 micrometers, wherein the dispersed phase comprises an antimicrobial material, and wherein at least a portion of the dispersed phase is present on the microstructured, anisotropic surface.

2. The surface structured article of claim 1, wherein the antimicrobial material comprises at least one of copper, cobalt, nickel, zinc, silver, gold, platinum, copper oxide, cobalt oxide, nickel oxide, zinc oxide, silver oxide, tin oxide, tantalum oxide, zirconium oxide, titanium dioxide, copper silicate, cobalt silicate, nickel silicate, silver silicate, gold silicate, platinum silicate, zinc silicate, zirconium silicate, copper sulfide, cobalt sulfide, nickel sulfide, silver sulfide, gold sulfide, platinum sulfide, tin sulfide, zinc sulfide, tantalum sulfide, zirconium sulfide, titanium sulfide, copper halide, cobalt halide, nickel halide, silver halide, gold halide, platinum halide, tin halide, zinc halide, tantalum halide, zirconium halide, titanium halide, copper salt, cobalt salt, nickel salt, silver salt, gold salt, platinum salt, tin salt, zinc salt, tantalum salt, zirconium salt, or titanium salt.

3. The surface structured article of claim 1, wherein the antimicrobial material comprises a polyatomic ionic material.

4. The surface structured article of claim 1, wherein the features comprise linear prisms, and the at least one dimension is a peak to valley height of the feature, wherein the peak to valley height is in a range from 1 micrometer to 500 micrometers.

5. The surface structured article of claim 4, wherein the peak to valley height is in a range from 25 micrometers to 75 micrometers.

6. The surface structured article of claim 4, wherein the peak to valley height is in a range from 100 micrometers to 500 micrometers.

7. The surface structured article of claim 1, wherein the microstructured, anisotropic surface comprises linear grooves with a peak to valley height in a range from 10 micrometers to 500 micrometers.

8. The surface structured article of claim 1, wherein the features have a major dimension substantially collinear with a first axis and a minimum dimension substantially collinear with a second axis.

9. The surface structured article of claim 1, wherein the features comprise ovoid shaped features.

10. The surface structured article of claim 1, further comprising a nanostructured surface on the microstructured, anisotropic surface.

11. The surface structured article of claim 1, wherein the microstructured, anisotropic surface comprises inorganic-organic hybrid material and polymeric material.

12. The surface structured article of claim 1, wherein the dispersed phase comprises nanoparticles.

13. The surface structured article of claim 1, wherein the dispersed phase has a concentration that is higher at the anisotropic surface than within the polymer matrix.

14. The surface structured article of claim 1, wherein the article further comprises a fluorochemical repellent layer on the anisotropic surface.

* * * * *